United States Patent [19]

Dennis

[11] E Patent Number: Re. 33,544

[45] Reissued Date of Patent: Feb. 26, 1991

[54] RELEASABLE BINDING SYSTEM FOR SNOWBOARDING

[75] Inventor: David Dennis, Virginia Beach, Va.

[73] Assignee: Look Alpine Products, Inc., Highland Park, Ill.

[21] Appl. No.: 331,325

[22] Filed: Mar. 23, 1989

Related U.S. Patent Documents

Reissue of:

[64] Patent No.: 4,652,007
Issued: Mar. 24, 1987
Appl. No.: 798,492
Filed: Nov. 15, 1985

[51] Int. Cl.[5] ..... A63C 9/00

[52] U.S. Cl. ..... 280/618; 280/14.2

[58] Field of Search ..... 280/607, 618, 616, 617, 280/636, 14.2; 441/74, 75

[56] References Cited

U.S. PATENT DOCUMENTS

| | | | |
|---|---|---|---|
| 3,088,748 | 5/1963 | Malmo | 280/606 X |
| 3,504,922 | 4/1970 | Wiley | 280/623 |
| 3,822,070 | 7/1974 | Salomon | 280/623 X |
| 3,888,499 | 6/1975 | Gertsch et al. | 280/617 |
| 3,900,204 | 8/1975 | Weber | 280/607 |
| 3,910,591 | 10/1975 | Salomon | 280/617 X |
| 3,917,298 | 11/1975 | Haff | 280/607 |
| 3,934,893 | 1/1976 | Greenleaf | 280/618 X |
| 3,936,064 | 2/1976 | D'Alessio et al. | 280/623 X |
| 3,936,065 | 2/1976 | Ramillon | 280/623 |
| 3,944,237 | 3/1976 | Teague, Jr. | 280/623 X |
| 4,008,908 | 2/1977 | Pierson | 280/607 X |
| 4,294,460 | 10/1981 | Kirsch | 280/607 |
| 4,305,603 | 12/1981 | Müller et al. | 280/607 |
| 4,403,785 | 9/1983 | Hottel | 280/607 X |

OTHER PUBLICATIONS

*The Burton Experience*, Burton Snowboards Catalog.

*Primary Examiner*—Charles A. Marmor
*Assistant Examiner*—Michael Mar
*Attorney, Agent, or Firm*—Jim Zegeer

[57] ABSTRACT

A releasable binding system for the sport of snowboarding includes releasable toe and heel binding clip means secured to forward and rear ends, respectively, of the ski board and simulated toe and heel members for releasable engagement with the releasable toe and heel binding clips along an axis parallel to the longitudinal axis of the ski board. The simulated toe and heel members are secured, releasably or permanently to the booted feet of a rider. In one preferred embodiment, the release of one ski boot binding is sensed and causes the substantially simultaneous release of the other ski boot binding. In a further embodiment, an attachment is provided for converting a boot to snowboarding has a sole plate adaptor releasably secured to the sole of the boot with a releasable binding plate member having simulated toe and heel members which is adjustably coupled to the releasable binding plate member so that the simulated toe and heel members project laterally relative to the sole of the boot. Flexible and resilient elements, such as elastomeric washers, permit or allow lateral movement of the user's leg to shift his weight and the direction of the force vector of the user's weight upon the ski board to provide a high degree of control.

36 Claims, 6 Drawing Sheets

FIG. 6
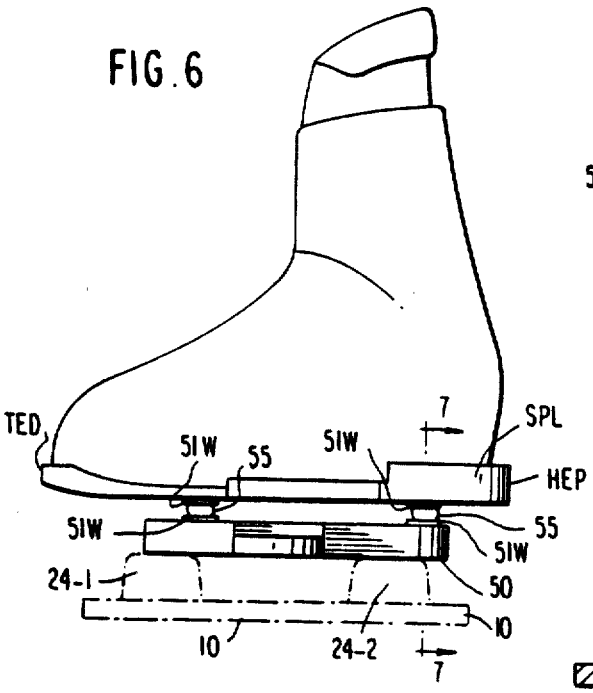
FIG. 7
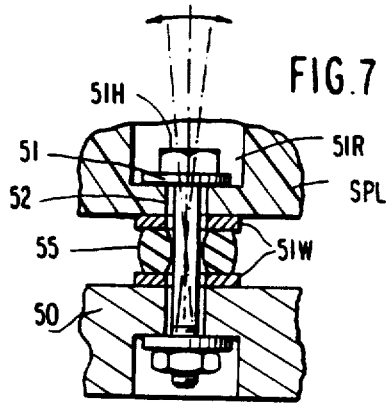
FIG. 5
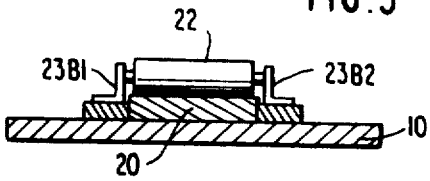
FIG. 9
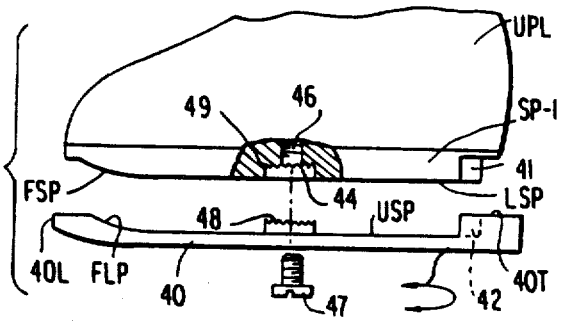
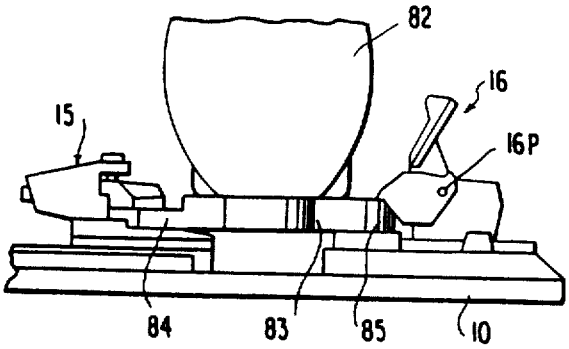
FIG. 8

FIG. 13
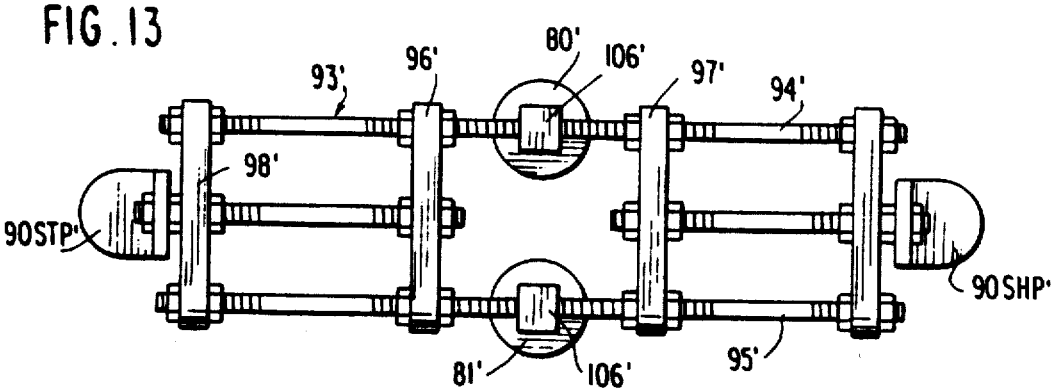
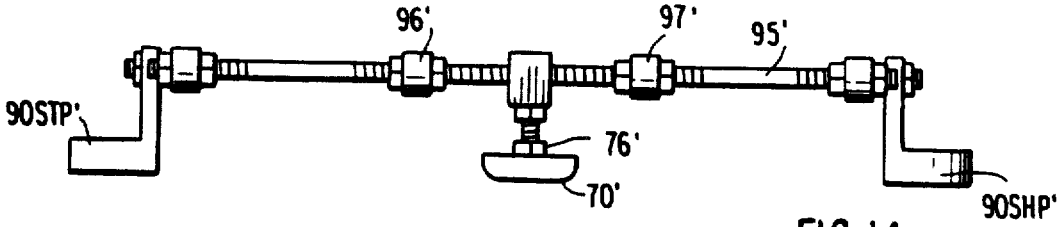
FIG. 14
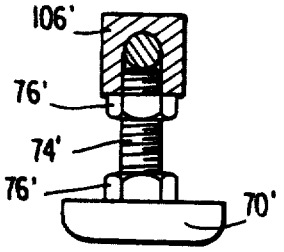
FIG. 15
FIG. 16
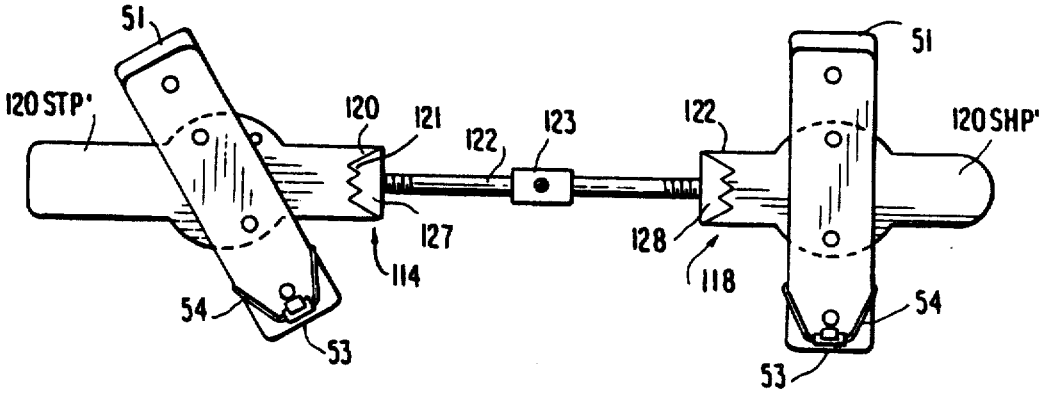
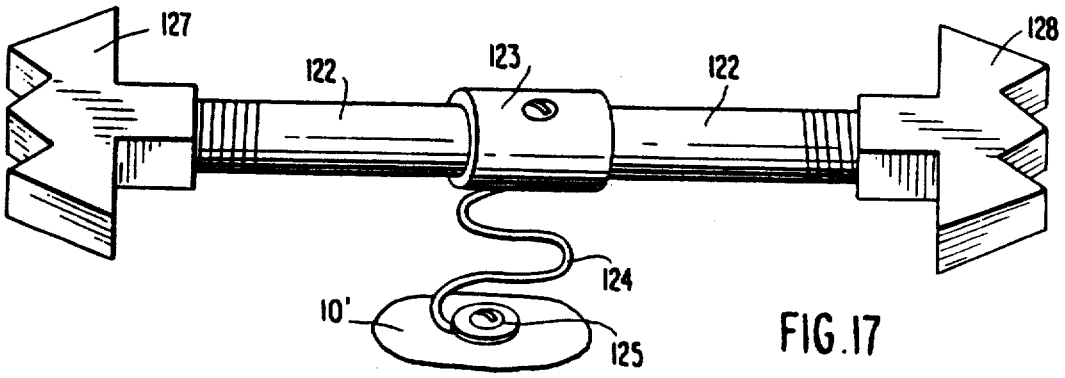
FIG. 17

RELEASABLE BINDING SYSTEM FOR SNOWBOARDING

Matter enclosed in heavy brackets [ ] appears in the original patent but forms no part of this reissue specification; matter printed in italics indicates the additions made by reissue.

BACKGROUND AND BRIEF DESCRIPTION OF THE INVENTION

This invention relates to a releasable binding system for the sport of snowboarding. Snowboards at the present time are ridden without any form of releasable binding system. Conventionally, the rider's booted feet are strapped to the upper surface of the ski board with the forward foot being at an angle to the longitudinal axis of the ski board and the rearward foot being placed at substantially normal angle to the longitudinal axis of the ski board. These feet orientations are maintained by the strap binding systems so that when the rider (ski-boarder) looses control and is wiping out, there are significant chances of injury to the rider while the ski board is strapped to his feet. Releasable bindings, are, of course, quite common with regular skies with typical examples being reflected in the patents of Wiley U.S. Pat. No. 3,504,922, Salomon U.S. Pat. No. 3,822,070, Gersthch et al U.S. Pat. No. 3,888,499, Salomon U.S. Pat. No. 3,910,591, D'Alessio et al U.S. Pat. No. 3,936,064, Ramillon U.S. Pat. No. 3,936,065 and Teague U.S. Pat. No. 3,944,237. Commercial ski boards which have boot bindings for securing the snow boarder's booted feet on the upper surface of the snowboard at predetermined Cangles (with the ability to adjust the angle) are well known in the art and are available from such companies as Burton Snowboards of Manchester Center, Vt., and which are generally of some laminated construction with the trailing lower surface being slightly curved or shaped with ridges or runners for control purposes. Since the ski board requires the ski boarder's feet to be oriented in an entirely different direction than on normal skies, those forces which would normally cause a release of conventional skies are not acting transversely to the ski i.e. in the general direction of the skier's feet.

According to this invention, the releasable ski board system comprises releasable toe and heel binding clip means secured to the forward and rear ends, respectively of the ski board, such releasable toe and heel binding clip means being of conventional construction of the type generally disclosed in the aforementioned patents. Simulated toe and heel members for releasable engagement or securement to the booted foot of the ski boarder are provided and the booted feet of the skier is secured to the simulated toe and heel member which, in turn, engage the releasable toe and heel clip binding means.

In a preferred embodiment, the release of one skier's boot from the ski board automatically and simultaneously causes release of the other ski boot from the ski board. In this regard, a coupling means extends between a pair of releasable boot bindings and senses the release of one boot from one of the pair of releasable boot bindings to cause a release of the other skier's boot. The releasable toe and heel bindings on the ski board can in a preferred embodiment simply be a single forward toe binding clip and a trailing single heel binding clip of conventional construction. In this aspect, there is a single simulated toe member connected to the forward boot or of the ski boarder and a single simulated heel member secured to the trailing boot of the ski boarder. A ski boot for use with the ski board according to the invention can comprise a sole piece with first toe and heel portions of conventional construction and an upper for securement to the user's foot. In this regard, the improvement comprises a simulated toe portion on one lateral side of the boot portion and a simulated heel portion on the opposite lateral side of the boot. The simulated toe and heel portions are aligned with each other and the longitudinal axis thereof is at an angle to the longitudinal axis of the first toe and heel portions for the forward boot and are normal to the longitudinal axis of the sole and heel piece for the trailing boot. In a preferred embodiment, the simulated toe and heel portions are releasably secured to a conventional boot (which may be a ski boot) by conventional ski toggle clamp so that the simulated toe and heel portions are released from the ski board and stay attached to the rider's boots, and can easily be unclamped so the boots can be used for conventional skiing. In a further aspect of the invention, a flexible resilient coupling means such as rubber or other elastomeric member or a coil spring is between the sole of the ski boot and the simulated toe and heel portions are able to shift the direction of the force vector of the rider's weight upon the ski board to thereby enhance the user's ability to control the ski board.

The above and other objects, advantages and features of the invention will become more apparent when considered with the following specification and accompanying drawings wherein.

Figure 1:
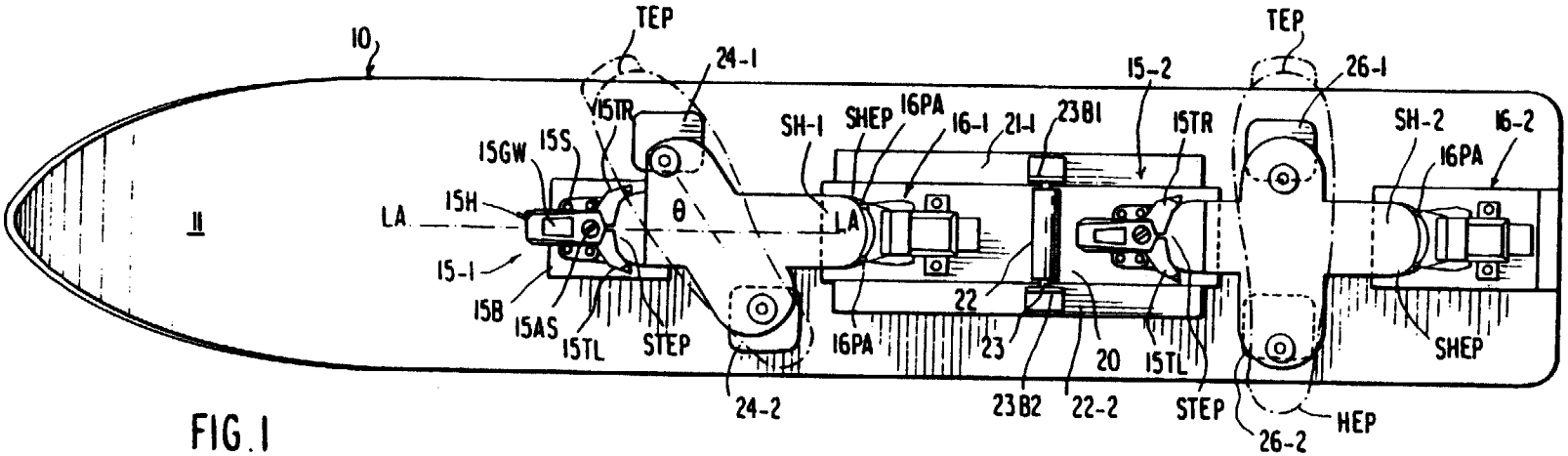
FIG. 1 is a top plan view of one preferred embodiment of the invention.
Figure 2:
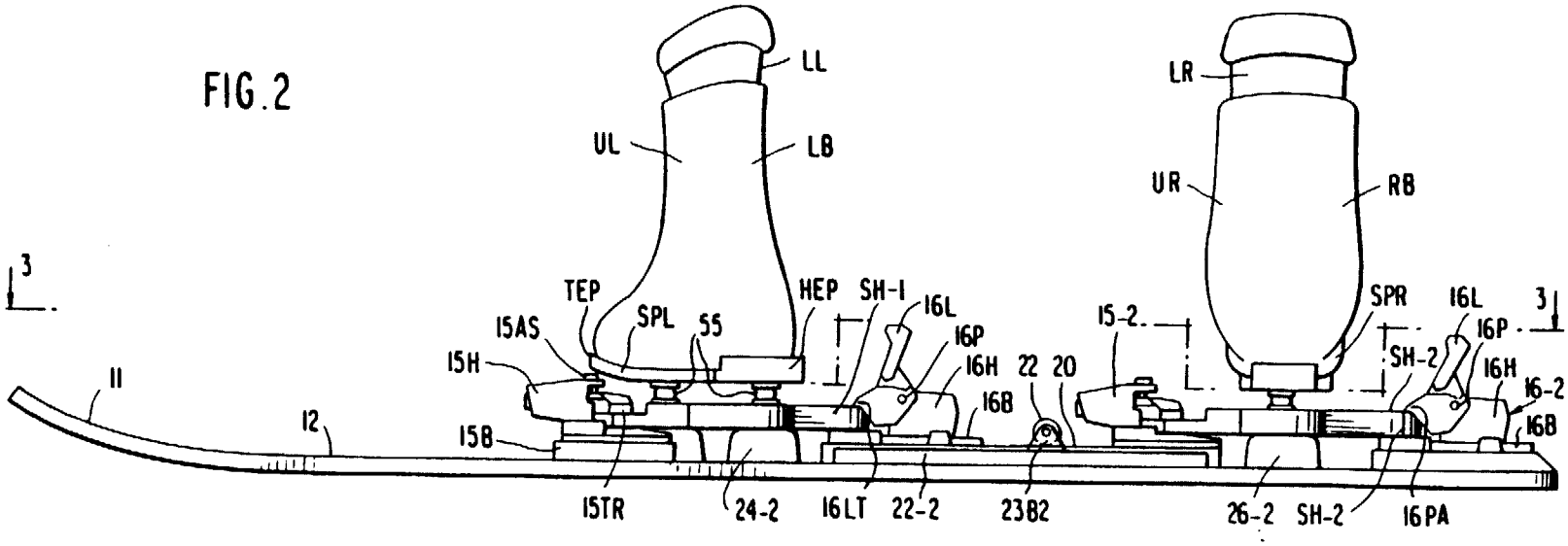
FIG. 2 is a side elevational view of FIG. 1.
Figure 3:
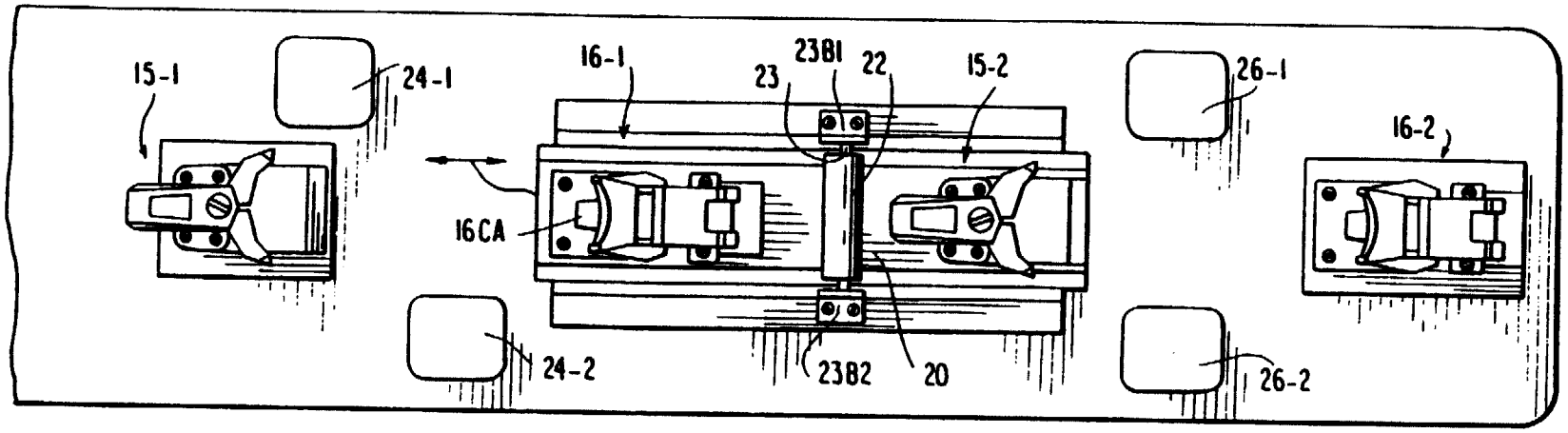
FIG. 3 is a sectional view taken along lines 3—3 of FIG. 2.
Figure 4:
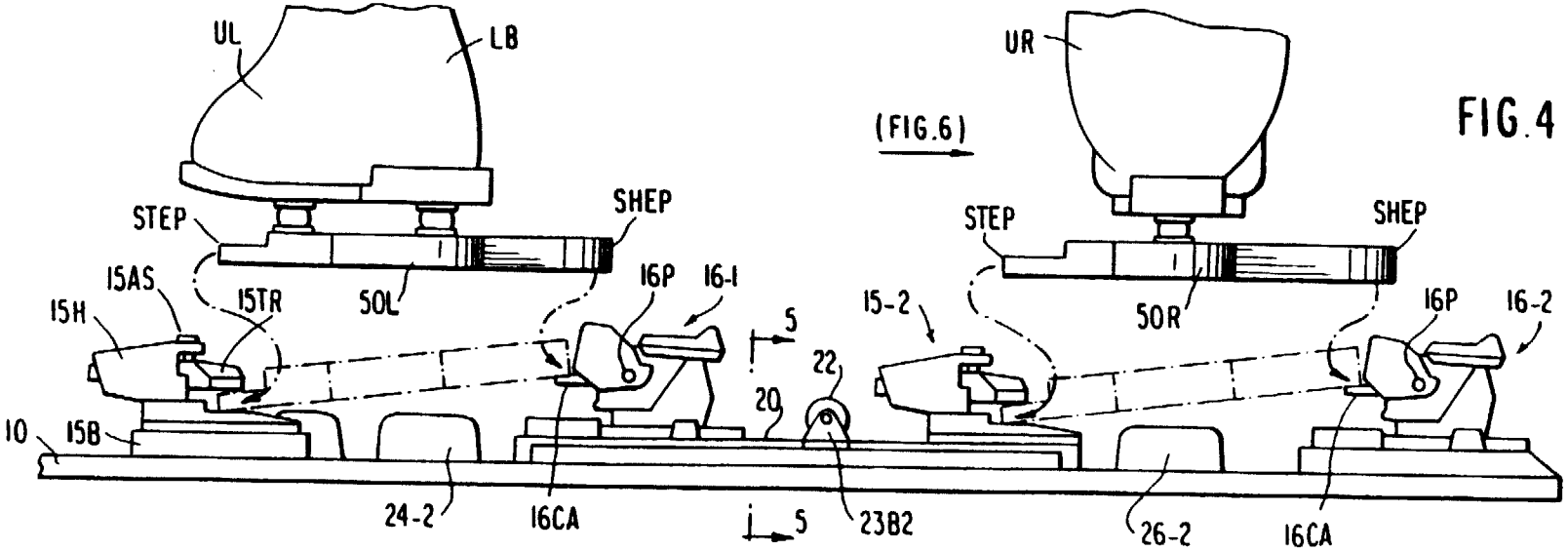
Figure 10:
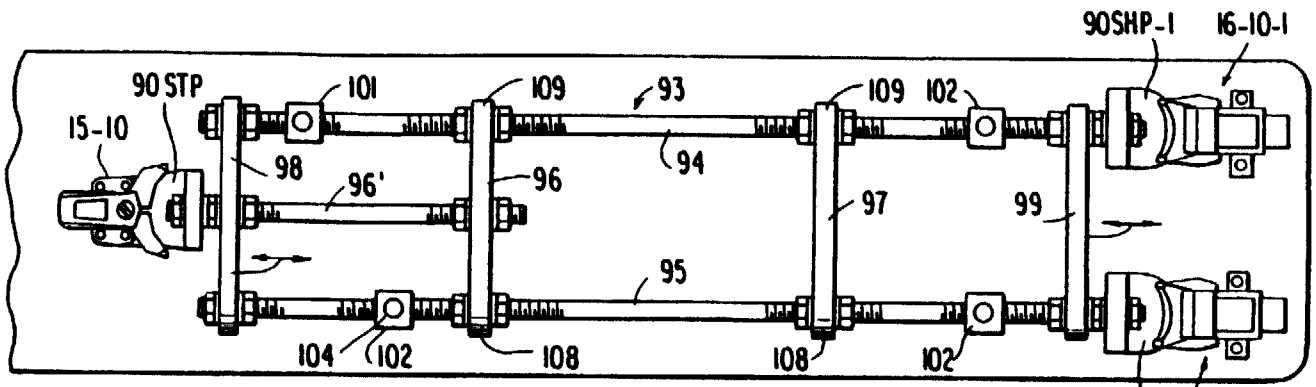
Figure 11:
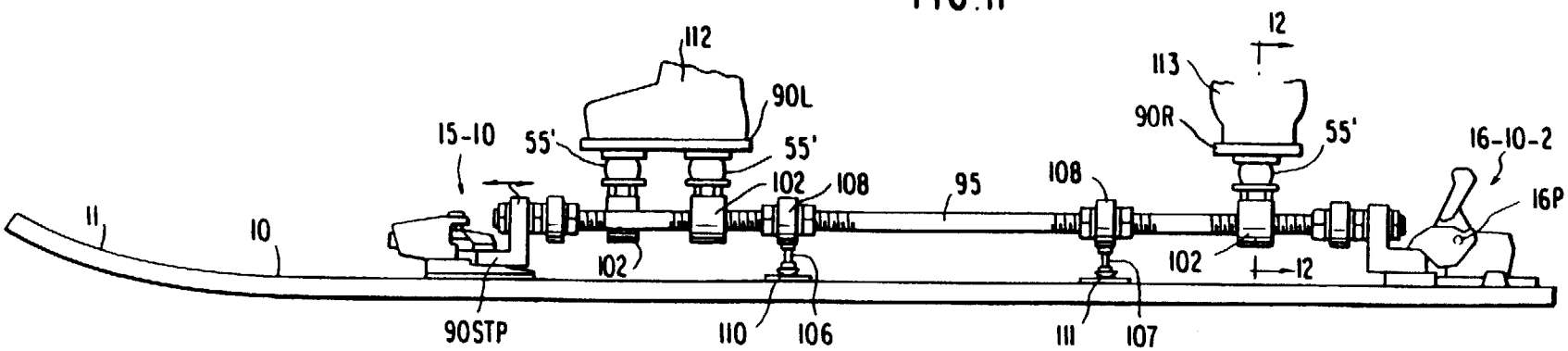
Figure 12:
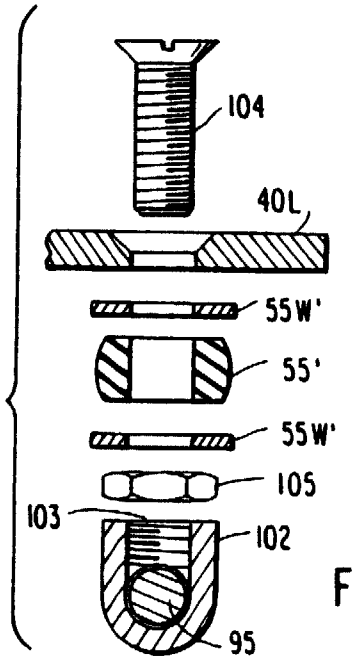
Figure 18:
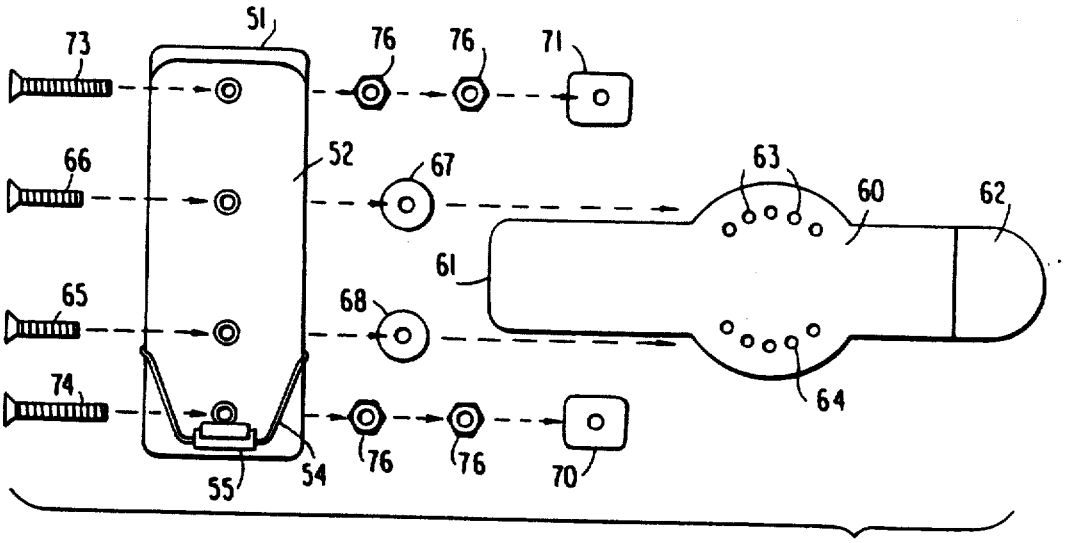
Figure 19:
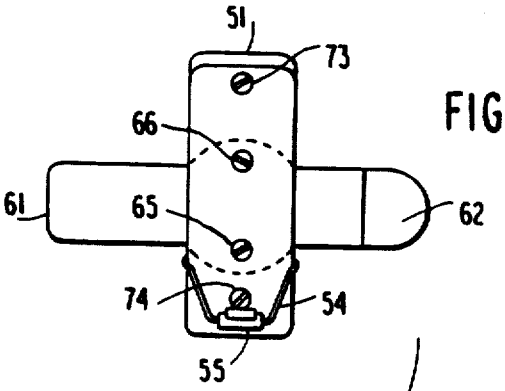
Figure 20:
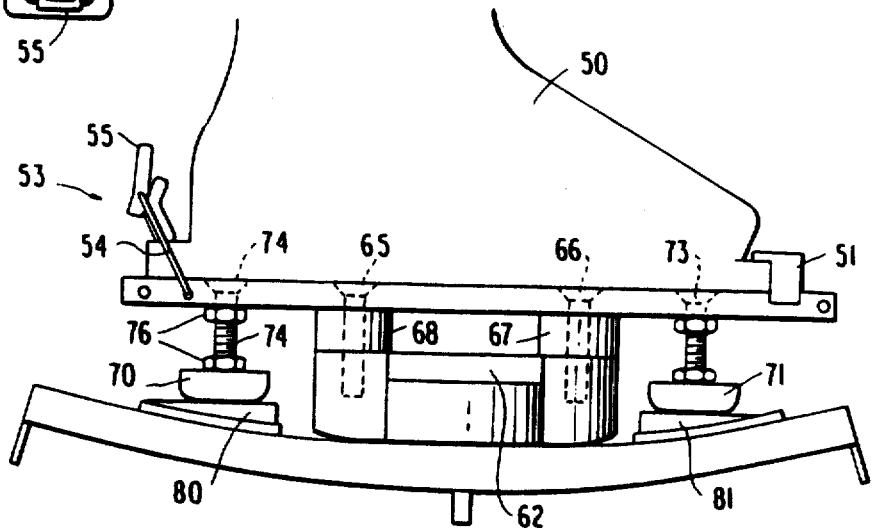

FIG. 4 illustrates the fitment of the simulated toe and heel portions to the toe and clip members shown in FIGS. 1–3, FIG. 5 is a sectional view taken on lines 5—5 of FIG. 4, FIG. 6 is a side elevational view taken in the direction of the arrow of FIG. 6 on FIG. 4, FIG. 7 is a sectional view taken on line 7—7 of FIG. 6, FIG. 8 is a sectional view showing a further embodiment of the invention wherein the simulated toe and heel portions are coplanar with the conventional toe and heel portions of a ski boot, FIG. 9 is an exploded partial sectional view of a further embodiment of the invention showing a separate simulated toe and heel element or plate which is adjustable relative to the boot, FIG. 10 is a top plan view of a further embodiment of the invention, FIG. 11 is a side elevational view of the embodiment shown in FIG. 10, FIG. 12 is a sectional view taken on lines 12—12 of FIG. 11, FIG. 13 is a top elevational view of a further embodiment of the invention;

FIG. 14 is a side elevational view of the embodiment shown in FIG. 13,

FIG. 15 is a sectional view of taken on lines 15—15 of FIG. 14,

FIG. 16 is a top plan view of a further embodiment of he invention,

FIG. 17 is an enlarged perspective view of a portion ıf the embodiment shown in FIG. 16, FIG. 18 is a further embodiment of the ski boot adap- or shown in FIG. 9, FIG. 19 is a top view of the assembled components of he exploded-view shown in FIG. 18 and, FIG. 20 is a side elevational view of the ski boot and daptor shown in FIG. 19 as applied to a ski board of he type shown in FIGS. 1 and 2.

DETAILED DESCRIPTION OF THE INVENTION

While ski boarding presents different problems to the kier, the safety aspect of ski boarding which requires he release of the ski board relative to the skier to avoid ıjury to the rider are essentially the same and those orces which would injure the skier due to the fact the ki board or ski remains secured to his foot are essen- ially the same, namely, the leverage and twisting forces aused due to the fact that the ski, and in this case the ski ıoard, remains secured to the ski foot while losing con- rol of the ski board and wiping out.

Referring now to FIGS. 1–7, a ski board 10 of con- 'entional construction having a upwardly curved for- vard end 11 and a main body portion 12, which may be ɔnstructed of of plastic, wood, metal, laminations, etc., ; provided with safety binding releases which include t least a forward toe piece binding clip assembly 15 vhich is mounted on the ski board and a heel engaging afety release clip assembly 16. The releasable safety ıinding toe clip assembly 15 may typically be of the ype manufactured by Salomon, and in this embodiment ; disclosed as their model S-626 which has a base plate .5B for securement to the upper surface of the ski board .0 by screws or other fasteners (not shown) and com- ɔrises a housing member 15H secured by screws 15S to ıase 15B and a pair of spring biased toe engaging clip ıieces 15TL and 15TR which are biased together by a pring (contained in housing 15H) with an adjustment crew 15AS for adjusting the tension on the spring :oupling the clip pieces 15TL and 15TR and a guage 'isible through gauge window 15GW which indicates o the user the amount of tension on the toe clip pieces .5TL, 15TR and hence provides an adjustment for the orce which would cause a release.

The structure of the heel clip 16 includes a housing nember 16H secured to a base member 16B which, in urn, is secured to the upper surface of ski board 10 (for he trailing or right foot in FIG. 1, it being appreciated hat for left-handed rider, the arrangement would be eversed with the right foot forward and the left foot railing). A handle member 16H is coupled to a pair of ɔrojecting arms 16PA which operate the heel clip as- embly release. The simulated heel SH2 is releasably etained by a locking tab 16LT positioned in retaining elation over the upper end of simulated heel SH, as llustrated. Heel clip 16CA projects under the simulated ıeel and when the rider steps down, the weight oper- ıtes the heel clip assembly to cause it to toggle and :lamp the simulated heel SHEP to the snowboard, as hown in FIG. 2. A pin and slot arrangement 16P and 16S to permit operation of this mechanism. An adjust- nent knob and gauge (neither shown) are also provided o enable the user to adjust the release force to release he rider from the heel binding clip.

In the embodiment shown in FIGS. 1–4, the heel clip assembly 16-1 for the leading or left foot and the releas- able toe clip assembly 15-2 for the trailing or right foot are mounted on a freely sliding plate 20. Freely sliding plate 20 is mounted between a pair of guides 21-1 and 21-2 which are secured to the upper surface of ski board 10. This slide and the guides, as well as the surface of the ski board therebetween may be coated or formed of a Teflon material or other low friction anti-icing sub- stances so that slide member 20 is capable of freely moving at any time there is a disengagement of either toe clip binding element 15-2 or heel clip binding ele- ment 16-1 and (as does the free floating socket bar 122 of FIGS. 16–17) constitutes a coupling means coupling the release of one skier's boot from the ski board to the binding for the other of the skier's boot to cause a sub- stantially simultaneously release of both boots of the rider from the ski board. Roller 22 is supported by a pair of bearing members 23B1 and 23B2 which are secured to guide members 21-1 and 22-2, respectively, for sup- porting shaft 23 upon which roller 22 is freely rotatable. The guides 21-1 and 22-2 may also be made of magnetic material having one magnetic polarity with a like polar- ity of magnetic material formed on the adjacent edge of the slide 20 so as to be in repelling relation to assist in the free movement of slide plate 20 whenever there is a release of one or the other of the ski boot bindings.

For the forward or left foot of the skier, a pair of support pedestals 24-1 and 24-2 are secured or other- wise formed on the upper surface of the ski board in the position generally indicated with a line between the two being at an angle to the center line or longitudinal axis LA of the ski and a similar set of support pedestals 26-1 and 26-2 are provided for the trailing or left foot. In this embodiment, it will be noted that the releasable toe binding clips 15-1 and 15-2 and the releasable heel clips 16-1 and 16-2 are located along the longitudinal axis of the ski as are the equivalent components of FIGS. 13 and 16 whereas in the embodiment shown in FIG. 10, there is a single releasable clip 15-10 and a pair of releas- able heel clips 16-10-1 and 16-10-2, and in FIG. 10, the releasable toe and heel clips are not in longitudinal alignment.

SKI BOOT CONSTRUCTION

While in its most basic embodiment, the release bind- ings according to this invention may incorporate con- ventional ski board bindings for securing to the feet of the skier, in which case various kinds of winter shoe or footware will do including work boots, hiking shoes, snowmobile boots and even high sneakers, in one pre- ferred embodiment, a conventional ski boot upper UL and UR with a conventional sole piece SPL and SPR is provided, the sole piece SPL having conventional toe engagement profile TEP and heel engagement profile HEP so that the boot may be used for conventional skiing purposes. According to the invention, a simu- lated toe piece having a simulated toe engagement pro- file STEP and a simulated heel engagement profile SHEP are formed in a plate member 50L and 50R and secured to the boot. In the embodiment shown in FIGS. 1–6, each of plates 50L and 50R, carrying the simulated toe and heel engagement profile pieces STEP and SHEP, is secured to the boot by means of a flexible coupling arrangement which enables the weight of the rider or ski boarder to be shifted laterally—force and aft of the ski board, and thereby exert control. As shown in FIG. 7, the plates 50 are secured by a bolt 51 passing through large bore holes 52 in the sole piece SPL of the ski boot, the head 51H of the bolts being seated in a recess 51R. A pair of washers 51W bear against the upper and lower surfaces of simulated toe, heel plate 50 and the lower surface of the sole piece SPL and are separated by a rubber washer 55. This provides a flexible resilient coupling to allow lateral movement of the rider's leg to thereby shift the direction of the force vector of the user's weight upon the ski board so as to enable the exercise of close control by the rider over the ski board operation.

In the embodiments of the boot illustrated in FIGS. 9 18, 19 and 20, a simulated toe and heel member are securable to a boot, which may be a ski boot, in various angles of adjustment. In the embodiment shown in FIG. 9, the upper UPL of the boot has a sole piece SP-1 which is provided with a lower surface LSP which is complementarily shaped to the upper surface USP of the simulated toe and heel piece 40. The heel cut-out 41 is circularly curved complementary to the cut-out 42 in the simulated toe heel piece 40 and, similarly, the forward portions FSP have a complementary shape to the lower portion FLP so that the simulated toe and heel piece 40 can be rotated relative to the sole piece SP1. A socket 44 is provided in the sole piece SP1 with a threaded fitment 46 for receiving a threaded screw fastener 47. A serrated or tooth member 48 coacts with tooth member 49 in the socket 44 to lock the simulated toe-heel piece 40 in various positions of adjustment. The leading edge 40L has a simulated toe profile for engagement with the front releasable toe clip 15-1 and the trailing edge 40T is shaped or has a profile for engagement with the heel binding piece 16-1. In this arrangement, the simulated toe-heel piece 40 can be at any angle of adjustment relative to the sole piece SP-1 such as at the angle of shown in FIG. 1 or at 90 degrees or normal thereto as shown for the trailing foot.

Referring to FIGS. 18–20, a conventional ski boot 50 has a toe profile which engages under clip 51 secured to or formed as a part of mounting plate 52. A heel toggle binding arrangement 53 has a link 54 operated by a toggle lever 55 to releasably secure the boot to plate 52. A simulated ski boot sole member 60 has a simulated toe profile 61 and a corresponding heel profile 62 and a plurality of threaded holes 63, 64 secured on arcs for adjustably securing simulated ski boot sole plate 60 to plate 52 via fasteners 65 and 66. Rubber spacers 67 and 68 allow lateral shifting of the rider or ski rider's weight so as to provide control corresponding to the control described earlier herein in regards to FIG. 7. A pair of height adjustable anti-sway blocks 70 and 71 are secured to the heel and toe ends 70, 71 of plate 52 by threaded fasteners 73, 74 and locking nuts 76. Antifriction plates 80, 81 are secured to or otherwise mounted on the ski board.

In the boot embodiment shown in FIG. 8, the boot 82 is provided with a sole plate 83 with relatively short laterally extended simulated toe portion 84 and short, laterally extended simulated heel portion 85. These laterally projecting relatively short members have sufficient flexibility in them to allow the lateral shifting of the user's weight in essentially the same fashion as is permitted by the rubber washers 55 in FIG. 7. In this case, the relative angularities of the simulated toe 84 and simulated heel 85 are relatively fixed with respect to the left and right boots, respectively, it being appreciated that these angles are relatively molded into the soles of the boots in this embodiment.

Referring now to FIGS. 10–12, a pair of plates 90L and 90R are connected to simulated toe piece 90STP and simulated heel pieces 90SHP-1 and 90SHP-2 by support member 93 which may be a single flat plate or, in the embodiment shown in FIGS. 10 and 11, a frame which includes threaded bars 94, 95 which are spaced by intermediate spacer bars 96, 97 and 98 99 at the forward and trailing ends thereof. Spacer bars 96,98 are on the threaded rods 93 and carry a pair of threaded couplings 101,102 which receive threaded members 104 (FIG. 12) passing through plates 90, and washers 55W' and rubber washer 55' for threaded engagement with the threaded bore 103 of coupling member 102. A lock washer 105 prevents the screw or coupling member 104 from coming loose. Height adjustable anti-sway blocks 106 and 107 (shown in detail in FIG. 15) are provided at the lateral ends 108, 109 of each spacer bar 96 and 97, respectively and engage antifriction plates 110 and 111 which are mounted or otherwise secured to the upper surface of the snow board 10. In this case, the foot bindings 112 and 113 are similar to those used on conventional ski boards so that when the forward or toe binding clip 15-10 or the heel binding clips 16-10-1 or 16-10-2 release due to wiping out and forces applied thereto, the rider or ski boarder is released from the ski board, but the frame 93 remains secured to the ski boarder's feet. In this embodiment, the distance between the simulated toe piece 90STP and the simulated heel pieces 90SHP-1 and 90SHP-2 are longitudinally adjustable on threaded frame members 93. Moreover, the position of the mounting members 102 may be adjusted along the bars 94 and 95 to provide various angles of adjustment to suit the individual rider and the angle of adjustment of the members 101 and 102 relative to each other may be adjusted to provide the user or rider with the most desirable angular orientation particular to that particular rider.

A similar arrangement is shown in FIGS. 13–15 wherein the frame 93' is provided with but a single simulated toe piece 90STP' and a single simulated heel piece 90SHP' and the anti-away blocks 107 and 108 are provided in the center of the threaded bars 94, 95.

Referring now to FIGS. 16 and 17, in this embodiment, the release concept described earlier herein is incorporated and allows the rider's feet to be free of each other once the release from the ski binding has taken place. In this embodiment, the foot plates are similar to the arrangement shown in FIGS. 18, 19 and 20 except in this embodiment, the simulated heel for the left foot is a socket device 119 in which a female socket member 120 has a series of teeth 121 and a similar socket mechanism 122 is provided in place of the simulated toe shown in FIGS. 18–20. A similar oppositely facing socket 18 replaces the simulated toe piece for the right foot. A free floating socket bar 122 is secured by a collar 123 and a tether strap 124 and wing nut fastener 125 to the ski board 10'. The ends of free floating socket bar 122 have formed therein complementary socket elements 127 and 128 which are complementary to the socket formations 120 and 122, respectively. The simulated toe piece 120STP and the simulated heel piece 120SHP are received in the releasable binding clips 15-1 and 16-2 of the ski board shown in FIG. 1. In this embodiment, of course, the slide plate and the intermediate heel clip 16-1 and the intermediate toe clip member 15-2 as well as the roller are removed or replaced by the structure shown in FIGS. 16 and 17.

The anti-sway blocks prevent unnecessary torque on the ski bindings caused by the edge (turning) engagement forces of a snow board with the snow surface and also gives four areas of contact to the snow board thereby providing relatively strong stability. The anti-sway blocks are adjustable in height. It will be appreciated that the releasable binding system for snow boards of the embodiments shown herein operate on the principle of simultaneous release of both feet from the ski board. In the embodiment shown in FIGS. 10, 11 and 12, the feet are bound as one unit on the mounting plate or frame. In the preferred embodiment however, the rider's feet are on separate plates, free of each other, and each foot is attached to a plate that has a simulated toe and heel of a ski boot which runs perpendicular or laterally to the toe and heel of the rider's foot. The plate can be bound to the snow board by a pair of ski bindings that are aligned lengthwise in the middle of the snow board. There is one heel binding piece attached to the rear of the snowboard and one toe binding piece attached towards the nose of the board. The other toe and heel binding pieces are attached to a free sliding unit which is located in position between the guide pieces and attached to the snow board. Simultaneous release from the snow board is made possible because once a rider's foot is released form the snow board the sliding unit is free to slide away from the other foot causing the boot to be released from the snow board.

The invention also incorporates the concept of adapting conventional ski boots for snow boarding use and permitting relative lateral weight shifting movement of the legs through the use of rubber spacers spaced between the sole of the boots (one under the toe and the other under the heel) and the binding plates.

It will be apparent to those skilled in the art that the invention may be embodied in other specific forms without departing from the true spirit and character of the invention. The embodiments are to be considered as illustrative and not restrictive with the scope of the invention being indicated by the claims and all changes which become within the spirit and meaning of the claims as well as the equivalence thereof are intended to be embraced therein.

What is claimed is:

1. Snowboard apparatus comprising in combination, a snowboard having a longitudinal axis, releasable toe and heel binding clip means secured to the forward and rearward ends, respectively, of said snowboard, mounting plate means having longitudinally extending projections thereon for releasable engagement with said releasable toe and heel binding clip means along an axis parallel to said longitudinal axis of said snowboard and a pair of laterally extending portions for supporting each foot of a rider thereupon, said laterally extending portions extending parallel to the rider's feet and means for securing the foot of a rider to said mounting plate means with the rider's trailing rear foot being substantially normal to said longitudinal axis and the rider's forward foot being secured to said snowboard at a predetermined angle relative to said longitudinal axis of said snowboard.

2. The snowboard apparatus defined in claim 1 including means operative upon the release of one of said binding clip means for coupling the release of the rider's feet from said snowboard to the other of said binding clip means to cause a substantially simultaneous release of said mounting plate means and both feet of said rider from said snowboard.

3. The snowboard apparatus defined in claim 1 wherein said means for securing the feet of the rider to said snowboard includes means for permitting said rider to shift the force vector of his weight relative to said snowboard to control operation of said snowboard.

4. The snowboard apparatus defined in claim 1 wherein said plate means has a first longitudinal projection at the forward side of the user's leading foot for operative engagement with said a releasable toe binding clip secured to said ski board and the trailing side of the trailing foot has a second longitudinal projection carried thereon for operative engagement with a releasable heel binding clip secured to said snowboard, said first longitudinal projection and said second longitudinal projection constituting said lateral projections.

5. The snowboard apparatus defined in claim 4 said mounting plate means includes a forward plate member for said rider's forward foot and a separate trailing plate member for said rider's trailing foot, and a coupling member movable relative to said snowboard, said coupling member having means for simultaneously engaging (1) a trailing side of said forward plate member, and (2) the leading side of said trailing plate member so that a release by one of said binding clips causes a release of the other of said binding clips.

6. The snowboard apparatus defined in claim 1 wherein said mounting plate means comprises a separate plate for each foot of said rider.

7. A snowboard apparatus as defined in claim 1 said mounting plate means including, for sensing a release of one of said binding clips and causing a simultaneous release of the other of said binding clips.

8. A snowboard boot for use on snowboards as defined in claim 1, said boot having a sole piece with first toe and heel portions, and an upper for securement to the user's foot, said longitudinal projections being constituted by a simulated toe portion on one lateral side of said boot portion and a simulated heel portion on the opposite lateral side of said boot.

9. The snowboard boot defined in claim 8 wherein said simulated toe and heel portions are aligned with each other and the longitudinal axis thereof is at an angle to the longitudinal axis of said first toe and heel portions.

10. The snowboard boot defined in claim 8 wherein said simulated toe and heel portions are formed coplanar with said first toe and heel portions.

11. The snowboard boot defined in claim 8 wherein said simulated toe and heel portions are formed in a plate member, a flexible resilient coupling means between said plate member and said sole piece.

12. The ski boot defined in claim 11 wherein said flexible resilient coupling means is elastomeric.

13. The snowboard boot defined in claim 11 wherein said flexible resilient coupling means includes a pair of said elastomeric washers aligned and spaced fore and aft on the rider's boot.

14. The snowboard boot defined in claim 11 wherein said sole piece is in a plane above said plate member.

15. A pair of snowboard boots defined in claim 8 a first of said pair of snowboard boots having the longitudinal axis of its simulated toe and heel portion at about a 90 degree angle to the longitudinal axis of said first toe and heel portions, and the longitudinal axis of its simulated toe and heel portions being at an acute angle to the longitudinal axis of its first toe and heel portions.

16. A snowboard boot as defined in claim 15 including means for adjusting the angle of the rider's trailing foot relative to said mounting plate.

17. An attachment for converting a pair of boots, each having a sole to a snowboard boot for use with the snowboard defined in claim 1, comprising in combination, said mounting plate means including a pair of sole plate adaptor means and means for releasably securing one each of said pole adaptor members to the soles of said boots, respectively, each sole plate adaptor means including a releasable binding plate member, said releasable binding plate member having said, longitudinally extending projections formed therein, and coupling means for coupling said releasable binding plate member to said sole plate adaptor member at one of a plurality of angles so that said longitudinal projections project laterally relative to said sole of said boot.

18. The attachment defined in claim 17 wherein said coupling means includes means for a flexible resilient means to allow lateral movements of the user's leg to shift the direction of the force vector of the user's weight upon said ski board.

19. A pair of snowboard boots for use on snowboards, each said boot having a longitudinal axis and a longitudinal sole plate *member* having a longitudinally extending toe and heel portions, and an upper fixedly secured to said sole plate *member*, said upper being adapted for securement to the user's foot, the improvement comprising a first laterally extending projection on one lateral side of said sole plate and a second laterally extending projection on the opposite lateral side of said sole plate, said laterally extending projections being adapted to engage releasable toe and heel binding clips mounted on said snowboard and which are longitudinally aligned parallel with the longitudinal axis of said snowboard.

20. The snowboard boot defined in claim 19 wherein said laterally projecting toe and heel projections are formed coplanar with said first toe and heel projections.

21. The snowboard boot defined in claim 19 wherein said laterally projecting toe and heel projections are integrally formed in said sole plate member, a flexible resilient coupling menas between said *sole* plate member and said [sole piece] *snowboard.*

22. The snowboard boot defined in claim 21 wherein said flexible resilient coupling means is elastomeric.

23. The snowboard boot defined in claim 22 wherein said flexible resilient coupling means includes a pair of said elastomeric washers aligned and spaced fore and aft on the bottom of said sole plate.

24. A pair of snowboard boots defined in claim 19, a first of said pair of snowboards having the longitudinal axis of said laterally projecting toe and heel projections at about a 90 degree angle to the longitudinal axis of said first toe and heel portions, and the longitudinal axis of its laterally projecting toe and heel projections being at an acute angle to the longitudinal axis of its first toe and heel projections.

*25. Snowboard apparatus for supporting a rider having boots comprising,*

*a snowboard having a longitudinal axis,*

*releasable binding means secured to the forward and rearward ends, respectively, of said snowboard,*

*mounting plate means releasably engaged with said releasable binding means at the forward and rearward ends of said snowboard, respectively,*

*means for securing a rider's boots to said mounting plate means with the rider's trailing rear boot being substantially normal to said longitudinal axis and the rider's forward boot being secured to said snowboard at a predetermined angle relative to said longitudinal axis of said snowboard, and*

*means for causing a substantially simultaneous release of said mounting plate means and with both of said rider's boots being secured thereto, from said snowboard upon the release of one of said forward and rearward releasable binding means.*

*26. The snowboard apparatus defined in claim 25 including means for permitting said rider to shift the force vector of his weight relative to said snowboard to control operation of said snowboard.*

*27. The snowboard apparatus defined in claim 1 including:*

*a flexible resilient coupling means between said mounting plate means and said means securing the boots of the rider to said mounting plate means.*

*28. The snowboard apparatus defined in claim 11 wherein said flexible resilient coupling means includes a pair of elastomeric washers aligned spaced fore and aft, respectively, on each of the rider's boots.*

*29. Snowboard apparatus for supporting a rider having boots comprising in combination,*

*a snowboard having a longitudinal axis,*

*releasable ski binding means secured to the forward and rearward ends, respectively, of said snowboard,*

*mounting plate means having longitudinally extending projections thereon for releasable engagement with said releasable ski binding means along an axis parallel to said longitudinal axis of said snowboard and a pair of laterally extending portions, secured to said longitudinally extending projection, for supporting each foot of a rider thereupon, said laterally extending portions extending parallel to the rider's feet, and*

*means for securing the each boot of a rider to said pair of laterally extending portions of said mounting plate means with the rider's trailing rear boot being substantially normal to said longitudinal axis and the rider's forward boot being secured to said snowboard at a predetermined angle relative to said longitudinal axis of said snowboard.*

*30. The snowboard apparatus defined in claim 29, said releasable ski binding means includes a releasable ski clip and wherein said plate means has a first longitudinal projection at the forward side of the rider's leading foot for operative engagement with said binding means includes a releasable ski clip secured to said ski board and the trailing side of the trailing foot has a second longitudinal projection carried thereon for operative engagement with a releasable ski secured to said snowboard, said first longitudinal projection and said second longitudinal projection constituting said lateral projections.*

*31. A snowboard boot for use on snowboards as defined in claim 29,*

*said boot having a sole piece with binding engagement element and portions, and an upper for securement to the user's foot, said longitudinal projections being constituted by a binding engagement element on one lateral side of said boot portion and another binding*

*engagement element on the opposite lateral side of said boot.*

*32. The snowboard boot defined in claim 31 wherein said inding engagement elements are aligned with each other nd the longitudinal axis thereof is at an angle to the ngitudinal axis of said first binding engagement eleents.*

*33. The snowboard boot defined in claim 31 wherein said inding engagement elements are formed coplanar with aid first binding engagement elements.*

*34. The snowboard boot defined in claim 31 wherein said inding engagement elements are formed in a plate memer,*

*a flexible resilient coupling means between said plate member and said sole piece.*

*35. A pair of snowboard boots defined in claim 31, a first of said pair of snowboard boots having the longitudinal axis of the binding engagement elements at about a 90 degree angle to the longitudinal axis of said first binding engagement element, and the longitudinal axis of its binding engagement element being at an acute angle to the longitudinal axis of its binding engagement element.*

*36. A pair of snowboard boots as defined in claim 32, having a longitudinal axis,*

*first means for securing the feet of a rider to a snowboard, and*

*second means including elastomeric washers for permitting the rider to shift the force vector of his weight relative to said snowboard to control operation of said snowboard.*

* * * * *